(12) United States Patent
Long (10) Patent No.: US 6,240,141 B1
(45) Date of Patent: May 29, 2001

(54) LOWER-COMPLEXITY PEAK-TO-AVERAGE REDUCTION USING INTERMEDIATE-RESULT SUBSET SIGN-INVERSION FOR DSL

(75) Inventor: Guozhu Long, Newark, CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/162,431

(22) Filed: Sep. 28, 1998

Related U.S. Application Data
(60) Provisional application No. 60/094,734, filed on Jul. 31, 1998, and provisional application No. 60/084,895, filed on May 9, 1998.

(51) Int. Cl.[7] ............................. H04K 1/10; H04L 27/28
(52) U.S. Cl. ............................................. 375/260; 708/404
(58) Field of Search .................................... 375/259, 260, 375/295; 708/400, 403, 404, 405; 370/210, 478

(56) References Cited
U.S. PATENT DOCUMENTS

| | | |
|---|---|---|
| 4,608,647 | 8/1986 | White et al. .......................... 364/481 |
| 5,189,701 | 2/1993 | Jain ........................................ 381/41 |
| 5,206,886 | 4/1993 | Bingham ................................ 375/97 |
| 5,268,938 | 12/1993 | Feig et al. ............................ 375/122 |
| 5,297,070 | 3/1994 | Hua et al. ............................ 364/726 |
| 5,515,398 | 5/1996 | Walsh et al. ......................... 375/222 |
| 5,521,908 | 5/1996 | Younce et al. ....................... 370/32.1 |
| 5,610,908 | 3/1997 | Shelswell et al. ................... 370/210 |
| 5,623,513 | 4/1997 | Chow et al. .......................... 375/219 |

OTHER PUBLICATIONS
Dagdeviren, "Proposed Peak To Average Ratio Reduction Technique For G.Lite and G.dmt", ITU Study Group 15, NF–074, May 11, 1998.

*Primary Examiner*—Chi Pham
*Assistant Examiner*—Jean B Corrielus
(74) *Attorney, Agent, or Firm*—Stuart T. Auvinen

(57) ABSTRACT

A Digital-Subscriber Line (DSL) modem reduces signal peaks by digital processing. The peak-to-average ratio (PAR) is effectively reduced by the PAR reduction when the signal peaks are reduced before transmission. The DSL transmitter uses discrete multi-tone (DMT) signaling in which multiple carrier waves in different frequency bins simultaneously carry multiple data bits. After symbol encoding, the data in the multiple frequency bins are converted from the frequency domain to the time domain by an inverse fast-Fourier transform (IFFT). The IFFT is accomplished by two IFFT stages. The first stage produces an intermediate array that is input to the second stage, which produces the final time-domain output. The time-domain output is searched for peaks that exceed a clipping threshold of the transmitter's digital-to-analog converter. When an over-threshold peak is found, the intermediate-array inputs that contributed to the peak are examined. One or more subsets of these intermediate inputs is sign-inverted, and the effect of the sign inversion on the peak is examined. When the adjusted peak is below threshold, the subsets that include these intermediate inputs are chosen for sign-inversion. All intermediate inputs within the chosen subset are sign inverted, and the difference due to the sign inversion on each output samples is calculated and added to the outputs of the second stage to adjust the time-domain output. The subsets of the intermediate array correspond to input-array subsets since the first IFFT stage is aligned with the input subsets.

20 Claims, 10 Drawing Sheets

LOWER-COMPLEXITY PEAK-TO-AVERAGE REDUCTION USING INTERMEDIATE-RESULT SUBSET SIGN-INVERSION FOR DSL

RELATED APPLICATIONS

Provisional applications, Ser. No. 60/084,895 filed May 9, 1998, and Ser. No. 60/094,734 filed Jul. 31, 1998 have been filed on this application.

FIELD OF THE INVENTION

This invention relates to telephone systems, and more particularly to peak-to-average ratio (PAR) reduction for Digital-Subscriber Lines (DSL).

BACKGROUND OF THE INVENTION

High-bandwidth technologies that use the existing copper-cable telephone lines such as Digital-Subscriber Lines (DSL) are now becoming available. One type of DSL can provide bandwidth up to 8 Mbps downstream, or up to 2 Mbps symmetric. DSL approaches the bandwidth of T1 lines, about 1.5 Mbps. Several variations of DSL technology are being explored, such as HDSL, IDSL, SDSL, ADSL and VDSL. ADSL (asymmetric DSL) is particularly attractive for consumer Internet applications where most of the data traffic is downloaded to the customer. Upstream bandwidth for uploading data can be reduced to increase downstream bandwidth since most Internet traffic is downstream traffic. See U.S. Pat. Nos. 5,461,616, 5,534,912, and 5,410,343 for descriptions of ADSL technology.

Figure 1:
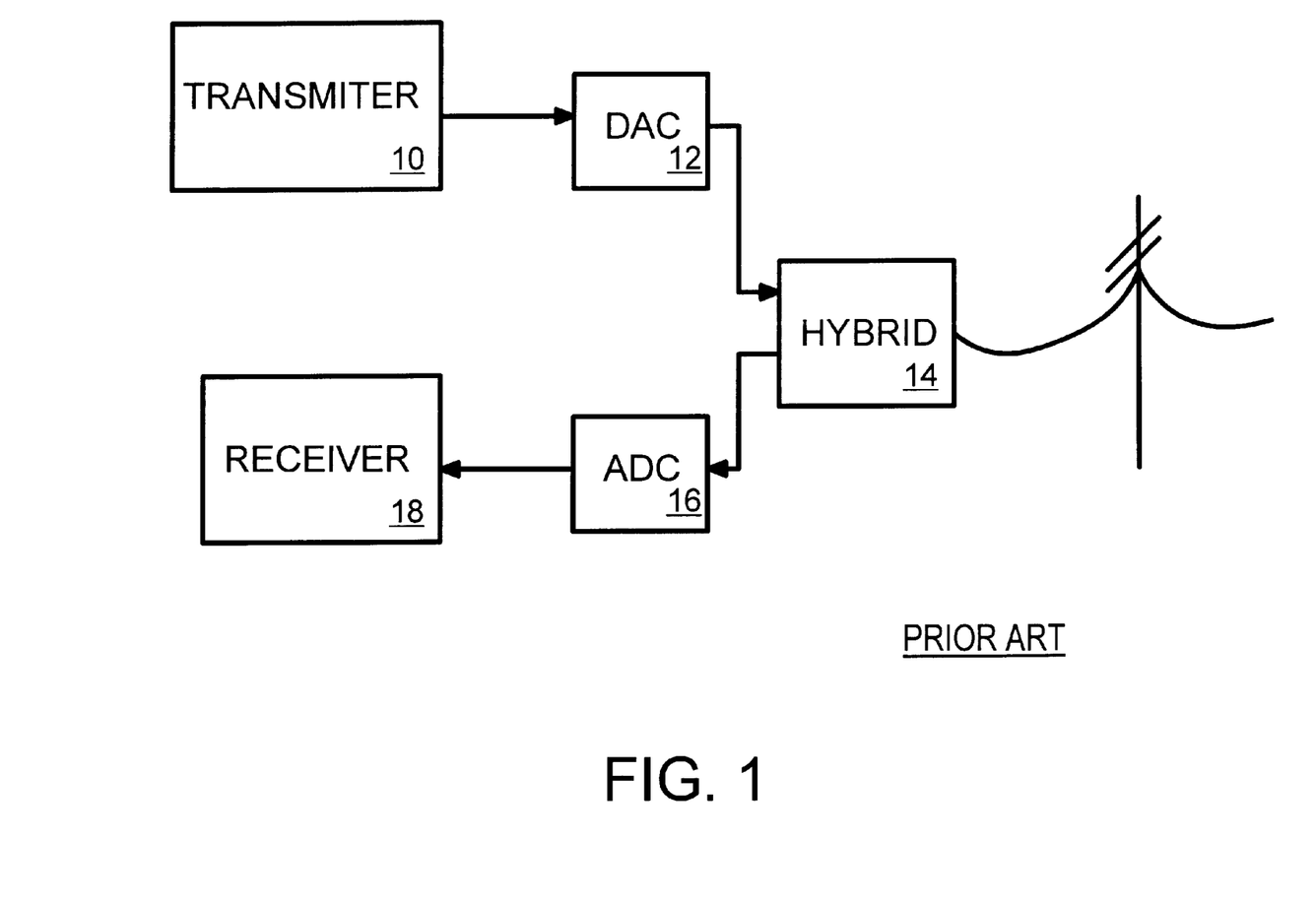
FIG. 1 shows a DSL modem.

DSL Modem—FIG. 1

FIG. 1 shows a DSL modem. Data from a personal computer or other equipment at the customer premises is sent to transmitter 10. Transmitter 10 arranges the data into frame packets and symbols using techniques such as trellis encoding or quadrature-amplitude modulation (QAM). The symbols are converted from digital to analog signals by digital-to-analog converter (DAC) 12. The analog signals then pass through hybrid 14 and the telephone line to the central office (CO). The signal from the central office is separated from the locally-transmitted signal by hybrid 14 and converted from analog to digital signals by analog-to-digital converter (ADC) 16. Receiver 18 detects the alignment of frames and decodes the symbols. The decoded data is sent to the local data equipment such as a computer. For greater detail see "DSL Simulation Techniques and Standards Development for Digital Subscriber Line Systems", by Walter Chen (Macnillian, 1998).

Figure 2A:
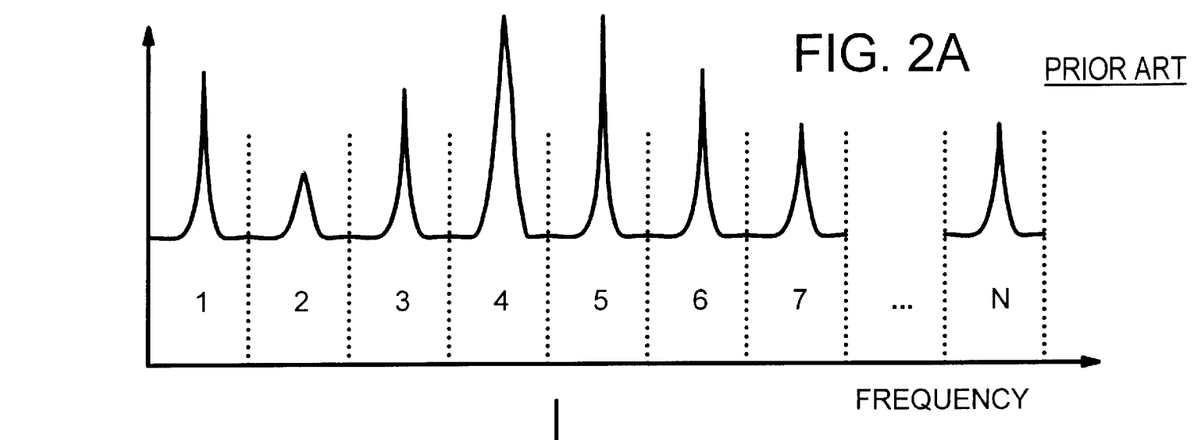
FIG. 2A shows a frequency spectrum of a discrete-multi-tone DSL signal.
Figure 2B:
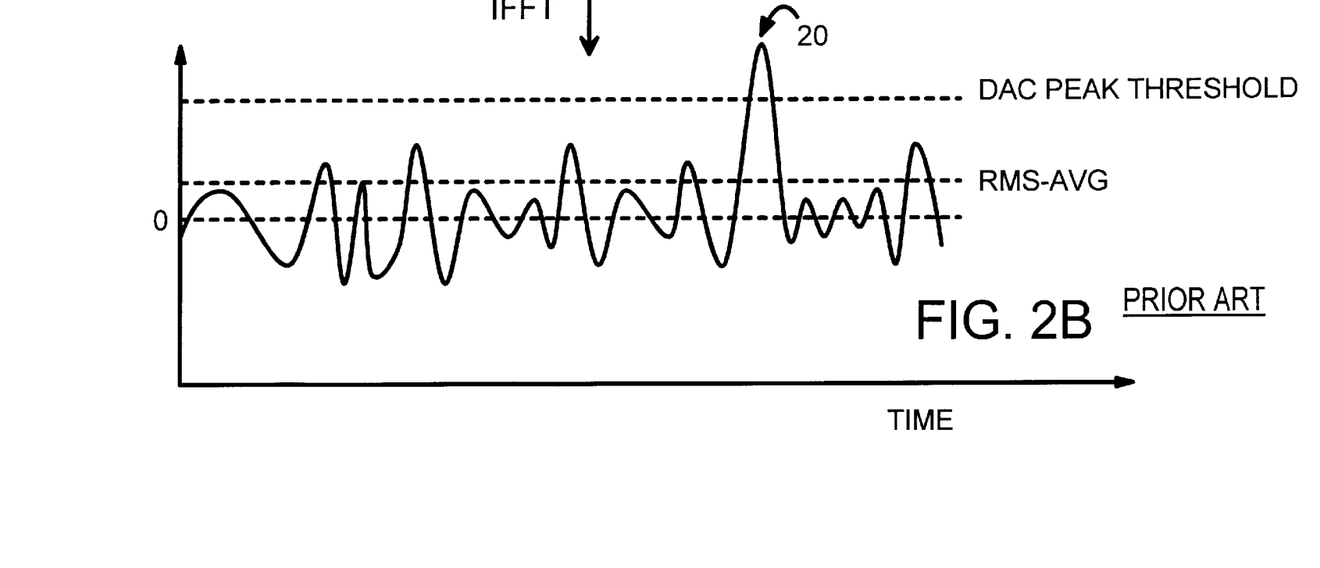
FIG. 2B shows a multiarrier output signal to a DSL telephone line.

Multi-Tone Signaling—FIG. 2

Rather than use single carrier, multiple carriers can be used. Separate frequencies or "tones" can each carry a portion of the data. The amplitude and phase of each carrier can be modulated to carry the data. This technique is known as discrete multi-tone (DMT).

FIG. 2A shows a frequency spectrum of a discrete-multi-tone DSL signal. The transmitted signal is composed of several separate carriers that are sufficiently separated in frequency so that the data from separate carriers can be extracted. The carriers are separated into frequency bins 0, 1, 2, 3, . . . N−1. Each frequency bin contains one carrier wave. Thus a total of N carriers provide N simultaneous data channels.

The N carriers in N frequency bins are combined by the transmitter into a single output signal that contains information from all N carrier waves. Since the output signal is real, the N input carriers have complex-conjugate symmetry. The (N−i)-th carrier is the complex conjugate of the i-th carrier, for i=1,2, . . . N/2−1. Therefore, only about half of the N carriers are independent carriers that carry information.

FIG. 2B shows a multi-carrier output signal to a DSL telephone line. FIG. 2B is a time-domain signal derived from the frequency-domain representation of FIG. 2A. An inverse Fourier transform is used to convert the N frequency bins of data to a time domain signal for transmission. Typically an inverse fast-Fourier transform (IFFT) is used to accelerate calculations to real-time speed.

Clipping Problem

The average power of the transmitted signal is related to the root-mean-square (RMS) average of the signal. This RMS voltage can be increased to reduce the effects of line interferences, but the specification puts a limit to the average transmit power. Some of the samples of the time-domain signal are below the RMS voltage while other samples are above the RMS voltage. For the same average power, multi-carrier transmission can have larger peak voltages than do single-carrier signals. The increased peak voltage of DMT systems is a problem that can limit its effectiveness.

Peak voltages cause problems when they exceed the dynamic range of the digital-analog converters and the amplifiers such as the line driver. More expensive and power-consuming DACs and line drivers with a wider dynamic range may be needed. FIG. 2B shows the maximum voltage of the DAC as the dashed line marked "DAC PEAK THRESHOLD". The DAC is able to accurately convert signals below this threshold, but signal peaks above this threshold cannot be accurately converted. The DAC or the line driver simply clips the signal to its maximum (peak threshold) voltage, which is less than the peak signal voltage. Peak 20 is then clipped or reduced in voltage.

Clipping is undesirable since some of the signal information is distorted. The ratio of the peak voltage to the RMS voltage is known as the peak-to-average ratio (PAR). The PAR depends on several factors, such as the line code used for symbol encoding, the number of carriers, and the number of signal levels used to encode the symbols. Filtering also affects the PAR, as does the channel (telephone line) and echo path for the received signal.

Figure 3:
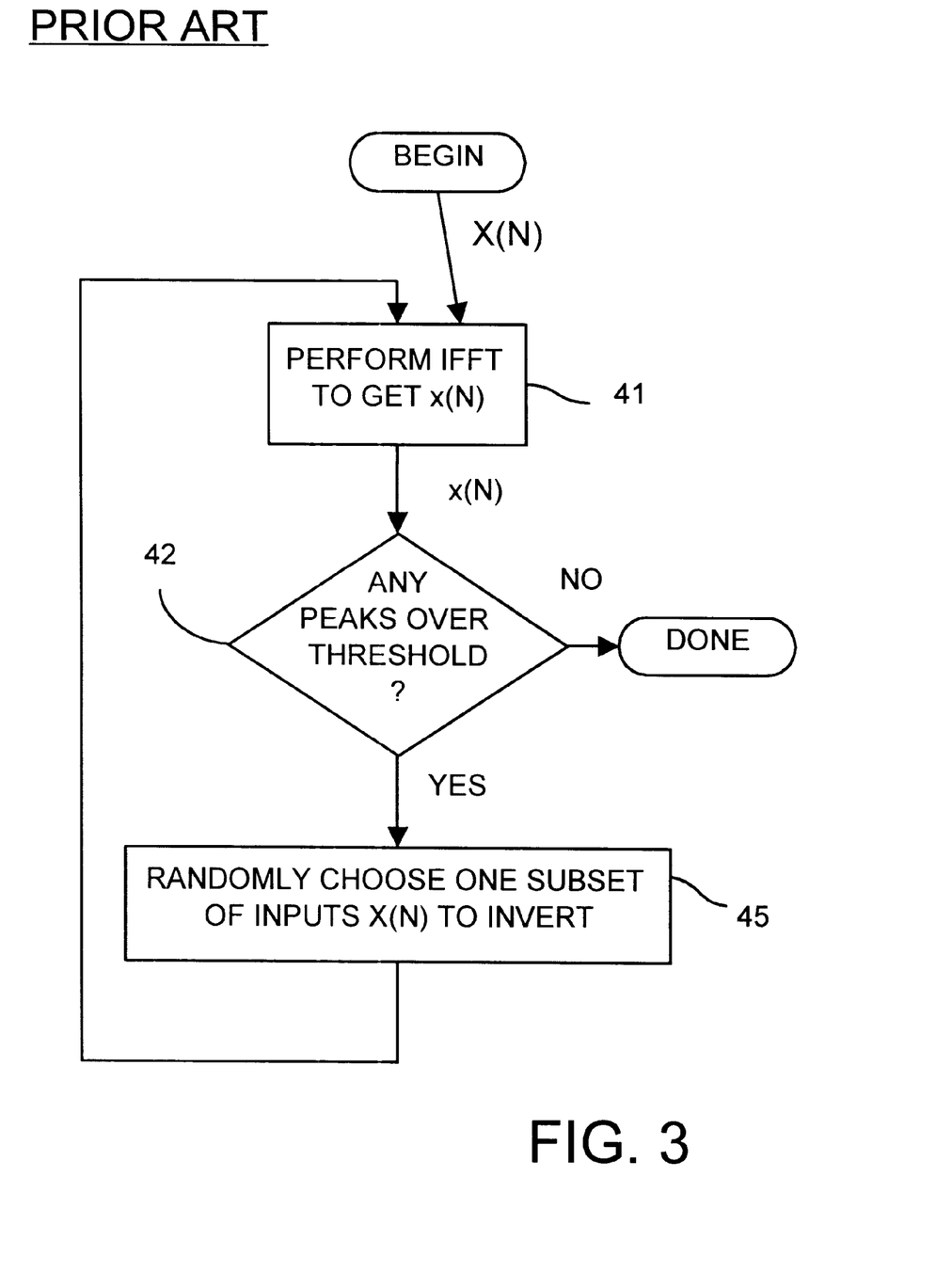
FIG. 3 is a flowchart of a PAR reduction technique that uses subset-sign inversion.

PAR reduction techniques are being developed for DSL systems. FIG. 3 is a flowchart of a PAR reduction technique that uses subset-sign inversion. Such a PAR reduction technique has been proposed by Lucent Technologies and Centillium Technology for the International Telecommunication Union (ITU), Telecommunication Standardization Sector, study group 15, in temporary document NF-074R2.

The signals for N carrier waves are input as X(N). An inverse fast-Fourier transform (IFFT) is performed on the X(N) frequency bins to produce a time-domain output x(N), step 41. If none of the x(N) signals exceed the peak-voltage threshold, step 42, then the time-domain output x(N) is transmitted since no clipping occurs.

When step 42 detects that one or more of the x(N) voltages exceeds the peak threshold, then the signal is modified to remove the peak. The X(N) inputs are divided into several is subsets that may or may not overlap. In step 45, one of these subsets is chosen at random or in a predefined sequence. The chosen subset has the sign changed for all of its frequency bins.

The modified inputs X(N) are then re-input to step 41 and the IFFT re-executed. Often the sign inversion reduced the largest peak voltage so that step 42 does not find any peaks exceeding the peak threshold. Otherwise, another subset is chosen in step 45 and its inputs are sign-inverted, and the IFFT again re-executed in step 41. Several iterations may be needed before all peaks are within the threshold. Once all possible subsets have been inverted without successfully reducing the peak voltage below the peak threshold, then the x(N) outputs are transmitted with clipped peaks. But with PAR reduction, the probability of clipping is greatly reduced.

The X(N) input is divided into several subsets, and some of the data bits are used to indicate which subsets have been inverted. The receiver reads these subset-sign-inversion bits and inverts the indicated subsets after FFT operation.

While such a subset-sign-inversion technique is effective, the added complexity for PAR reduction is relatively high since in each iteration we have to repeat the entire IFFT operation, which is complex and lengthy, requiring many multiplications and additions. Often, several iterations may be needed. The entire IFFT is re-executed as each way of subset inversion is tried. The subset is chosen at random rather than being chosen as a function of the location (time coordinate) and the value of the peak over the threshold.

What is desired is an efficient and effective peak-to-average reduction technique for multi-tone DSL. It is desired to reduce the probability of clipping of peaks with low computational complexity. It is desired to avoid expensive and power-consuming digital-to-analog converters and line drivers with wider dynamic ranges. A PAR-reduction technique that uses the inherent properties of the IFFT to reduce calculational overhead is desired. A better method of selecting subsets for sign inversion is desired to reduce the number of iterations required.

SUMMARY OF THE INVENTION

A peak-reducing Inverse Fourier transformer has an input array in a frequency domain. The input array contains multiple frequency bins. An output array in a time domain contains data points representing voltages at different time points. An intermediate array contains intermediate values.

A first transformer receives the input array. It generates the intermediate array by partially Inverse Fourier transforming the input array. A second transformer receives the intermediate array. It generates the output array by partially inverse Fourier transforming the intermediate array.

A peak searcher is coupled to the output array. The peak searcher searches the data points in the output array for voltages falling outside a clipping threshold. The peak searcher identifies a peak location of an over-threshold peak in the output array.

A subset sign inverter is coupled to the peak searcher. It inverts signs of subsets of original intermediate values in the intermediate array to generate sign-inverted intermediate values. When the sign-inverted intermediate values replace the original intermediate values in the intermediate array, the over-threshold peak in the output array is reduced in voltage and is within the clipping threshold. Thus the over-threshold peak is reduced by sign-inversion of the subsets of intermediate values.

In further aspects of the invention the chosen subset is one of a plurality of subsets of the intermediate array. Each subset contains all intermediate values in one or two rows of the intermediate array. Thus the subsets are row-aligned.

In still further aspects the input array is also divided into a plurality of input subsets. Each input subset contains all frequency bins in one or two rows of the input array. Each input subset corresponds to a subset of the intermediate array by including a same row location in an array. Thus the input subsets are aligned with the subsets in the intermediate array. Each input subset contains complex conjugate pairs of frequency bins.

A re-calculating means is activated when the peak searcher finds the over-threshold peak. It sign-inverts and calculates adjustment terms based on all intermediate values. The re-calculating means adds the adjustment terms to the data points in the output array to generate an adjusted output array. Thus the output array is adjusted by adding the adjustment terms rather than re-executing an Inverse Fourier transform.

Input-subset sign-inversion peak reduction is performed by sign-inversion of the intermediate array subset.

In further aspects the input array has a total of N frequency bins arranged into N1 rows of N2 frequency bins. The first transformer has a plurality of N1 first IFFT modules. The first IFFT modules are inverse fast-Fourier transform (IFFT) modules. Each of the first IFFT modules has N2 inputs of one row of the input array. Each of the first IFFT modules generates N2 intermediate values in a row of the intermediate array. The N2 intermediate values are an Inverse Fourier-transform combination of the N2 inputs to a first IFFT module.

The second transformer has a plurality of N2 second IFFT modules. The second IFFT modules are inverse fast-Fourier transform IFFT) modules. Each of the second IFFT modules has N1 inputs for one column of the intermediate array. Each of the second IFFT modules generates N1 data points in a column of the output array. The N1 data points are a Fourier-transform combination of the N1 inputs to a second IFFT module. Thus the first transformer is a row-aligned IFFT while the second transformer is a column-aligned IFFT. The input subsets and subsets of the intermediate array are both row-aligned.

In still further aspects the multiple frequency bins are arranged column-wise into the input array, but the data points are transmitted row-wise in time from the data points in the output array. Thus the row and columns are reversed during transforms.

DETAILED DESCRIPTION

The present invention relates to an improvement in peak reduction for DSL systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that Fourier transforms can be calculated by dividing the transform into two or more steps or partial transforms, using the so-called fast-Fourier transform (FFT). Rather than simply invert subsets of the inputs and then re-execute the entire transform, the inventor stores intermediate results and inverts subsets of the intermediate results. When the IFFT is divided into two steps or partial transforms, only the final step needs to be re-calculated when one or more of the intermediate-result subsets are inverted. The re-computational complexity is thus reduced. Furthermore, the re-calculation of the entire final IFFT step can be replaced by simple update of all the final output samples with the differences due to the sign inversion. The complexity of updating final output samples is often smaller than that of recomputing the entire final IFFT step.

The inventor has also realized that the largest signal peak can be more easily traced back to the intermediate-result subsets than to the input subsets. Thus subset inversions that can reduce the clipping peak are selected while subset inversions that cannot reduce the clipping peak are discarded.

The inventor has further realized that the intermediate-result subsets can be associated with the original-input subsets by the proper subset partitioning. The first partial transform is performed on the subsets rather than orthogonal to the subsets. Thus the intermediate results are also arranged or grouped by the same input subsets.

Figure 4:
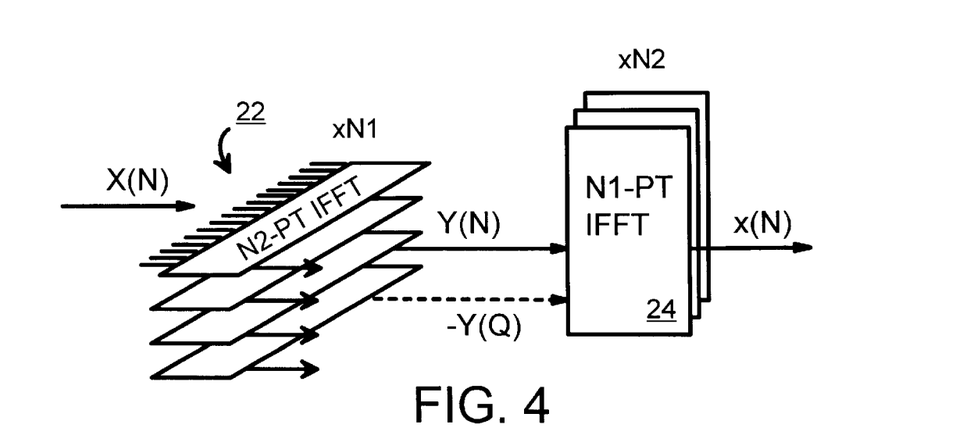
FIG. 4 shows PAR reduction by sign-inversion of intermediate results in a 2-stage inverse fast-Fourier transformer.

Intermediate-Result Sign Inversion—FIG. 4

FIG. 4 shows PAR reduction by sign-inversion of intermediate results in a 2-stage inverse fast-Fourier transform. The input frequency bins X(N) are transformed from the frequency domain to the time domain signal x(N) by an inverse fast-Fourier transform (IFFT). The total number of frequency bins N of the input is equal to the total number of time points N of the output. The parameter N is factored as N=N1* N2 for a two-step or two-stage IFFT. For more detail on FFT see "Digital Signal Processing—Principles, Algorithms, and Applications", by Proakis and Manolakis, $3_{rd}$ ed. (1996), pp. 448 et seq.

The frequency-domain input X(N) is placed column-wise into a rectangular N2×N1 matrix and input to first transform 22. First transform 22 contains N1 transforms, and each transform is an N2-point IFFT transform. Each of the N1 transforms performs an N2-point IFFT given by the equation:

$$S(i, k) = \sum_{l=0}^{N/2-1} X(l*N1 + i)e^{j2\pi kl/N2}$$

for the i-th N2-point IFFT.

The result of each N2-point transform is rotated by $e^{j2\pi ik/N}$ to form N2 outputs Y(i,k):

$$Y(i,k)=S(i,k)e^{j2\pi ik/N}$$

A total of N1×N2 intermediate outputs Y(i,k) are generated. These intermediate outputs are input to second transform 24. Second transform 24 contains N2 transforms, each being an N1-point IFFT. Second transform 24 performs the equation for the k-th N1-point IFFT:

$$x(i, k) = \sum_{l=0}^{N1-1} Y(l, k)e^{j2\pi il/N1}$$

Second transformer 24 converts the intermediate result Y(i,k) to the final output x(n)=x(i,k) where n=*N2+k, i=0,1, ... N1−1; k=0,1, ... N2−1, n=0,1, ... N−1.

When a peak exceeding the peak threshold is detected, one or more of the subsets is inverted. The input subset has one or more rows of N2 inputs. Since the first transformer 22 is an N2-point IFFT that operates on a row of N2 inputs, sign inversion of an input subset causes the corresponding intermediate outputs to invert. Since all of the inputs in a subset are inverted, each of the corresponding intermediate outputs is also inverted.

Rather than invert the signs of an input subset and repeat the first-stage IFFTs, it is equivalent and much simpler that, the signs of an intermediate-result subset is inverted directly. The inverted intermediate subset Q is shown as −Y(Q). The remaining, un-inverted intermediate results Y(i) and the inverted intermediate subset −Y(Q) are input to second transformer 24 to generate the revised output x(N).

Figure 5:
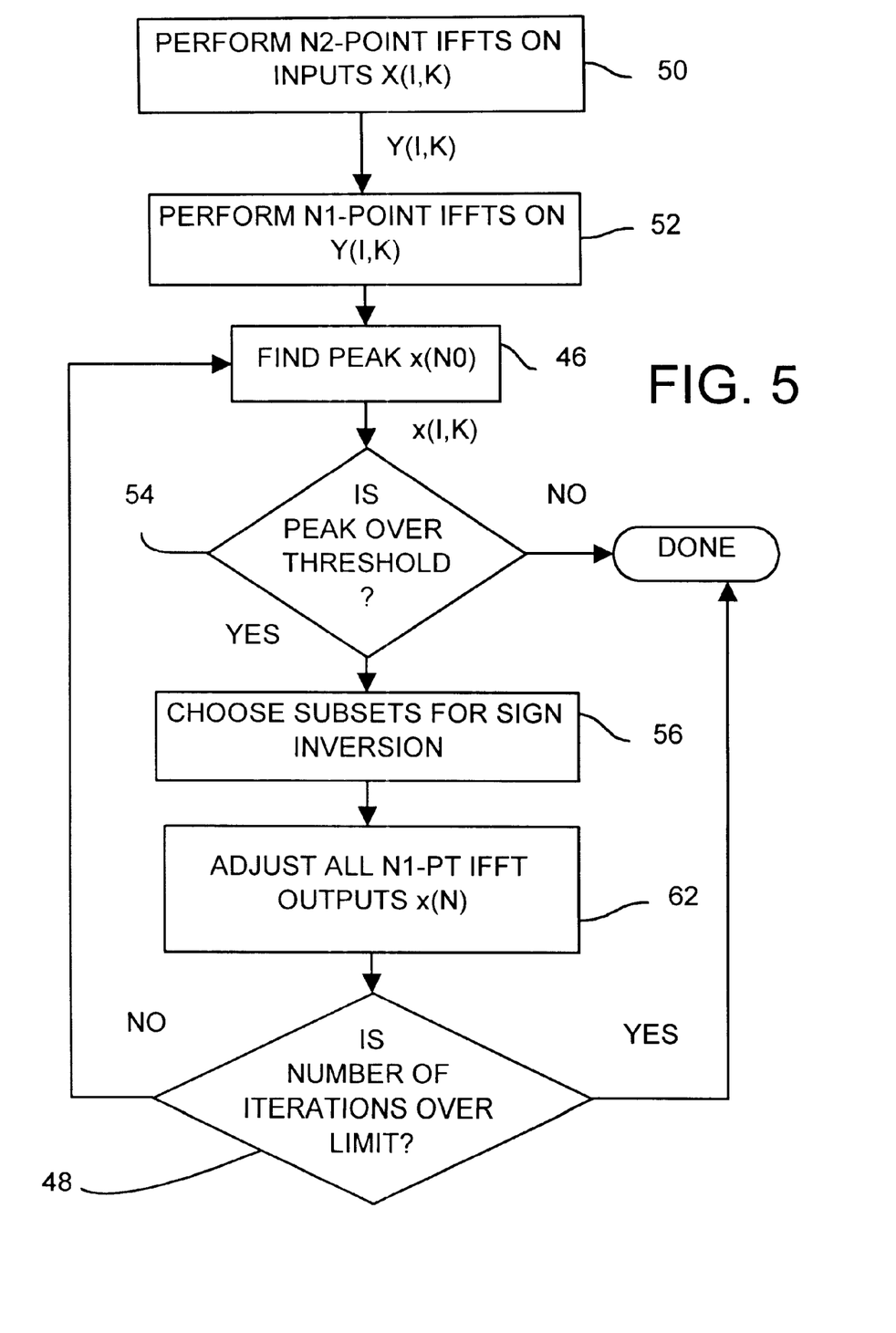
FIG. 5 is a flowchart for intermediate-result sign-inversion for PAR reduction.

Difference Terms Subtracted—FIG. 5

FIG. 5 is a flowchart for intermediate-result sign-inversion for PAR reduction. The frequency-domain inputs X(N) are loaded column-wise into an N2 ×N1 matrix X(i,k), where X(i,k)=X(n)=X(i+N1*k), n=0 to N−1, k=0 to N2−1 and i=0 to N1−1. An N2-point IFFT is performed on each row of N2 inputs to produce a row of N2 intermediate-result outputs Y(i,k). A total of N1 of the N2-point IFFTs are performed in step 50. This is the first transformer.

The intermediate results Y(i,k) are stored for later use, but are also sent to the second transformer. N1-point IFFTs are performed on each column of N1 of the intermediate results Y(i,k). A total of N2 of the N1-point transforms are performed in step 52, yielding the output matrix x(i,k).

The time-domain outputs from step 52 are all real signals since the frequency-domain input has complex-conjugate symmetry. They are scanned for peaks, and the largest peak (the output with the highest absolute value) is detected, step 46. This peak is located at time N0. The peak's voltage is compared to the peak threshold, step 54. If the largest peak is within the peak threshold, then no clipping can occur and the time-domain outputs x(N) can be output to the DAC for transmission. Sign inversion is not required.

When a peak over threshold is detected by step 54, one or more of the subsets need to be inverted to try to reduce the peak's voltage. One set of the subsets is chosen for inversion in step 56. Rather than randomly choose a set of subsets, the effects of the sign inversion of sets of subsets on the peak value are evaluated first to find out which sign inversion pattern gives the best peak reduction effect. The peak is at N0=i0*N2 +k0, where the column is k0, and the row is i0.

Once the subset is chosen for sign-inversion, the final outputs are re-calculated. Rather than simply re-execute the entire IFFT, or even re-execute the second transform, the outputs are adjusted. When n0 is the index of the peak output, x(n0) is calculated from the intermediate results Y(i,k0), i=0,1, ... N1−1.

$$x(i0, k0) = \sum_{l=0}^{N1-1} Y(l, k0) e^{j2\pi l i0/N1}$$

If the i1-th row is sign inverted, among all N1 values of Y(i,k0), only Y(i1,k0) changes its sign. The term $-Y(i1,k0)e^{j2\pi i1 i0/N1}$ replaces $Y(i1,k0)e^{j2\pi i1 i0/N1}$ in the second transform's sum. The difference is thus $-2Y(i1,k0)e^{j2\pi i1 i0/N1}$. If this sign inversion can effectively reduce the peak, each output x(i,k) has $-2Y(i1,k)e^{j2\pi i1 i0/N1}$ added in step 62. All N outputs are adjusted instead of recalculating entire N2 N1-point IFFT.

Calculation is reduced since computing and adding this term to adjust the output is simpler than recalculating the entire N1-point IFFT when N1 is reasonably large. For the sign inversion of each subset, one adjusting term is added. The complexity is thus proportional to the number of subsets inverted. Typically, the maximum number of subsets inverted can be limited. When N1 is very small the N1-point IFFT can simply be re-calculated.

When too many iterations have occurred, step 48 ends the attempt at PAR reduction, allowing the peak to be clipped. Since the probability of not being able to reduce the peak is very small, error correction should be able to recover the signal. When the number of iterations is still within the allowed number of iterations, step 46 again searches for the largest peak. The location N0 of the largest peak can change with each iteration, especially when the peak threshold is low. When the new largest peak is below threshold, step 54 ends the PAR reduction. Bits in the data stream are set or cleared to indicate to the receiver which subsets were inverted.

Figure 6A:
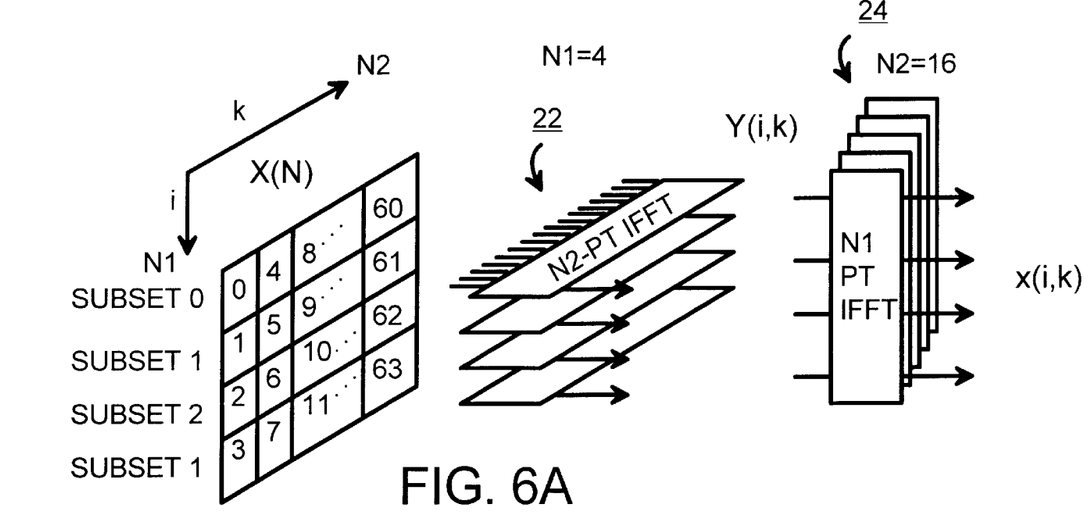
FIG. 6A illustrates how the first transform is aligned with the subsets for sign inversion.

Transform Alignment with Subsets—FIG. 6A

FIG. 6A illustrates how the first transform is aligned with the subsets for sign inversion. The frequency-domain input X(N) is arranged column-wise into an N2×N1 matrix X(i,k). The row index i runs from 0 to N1−1, while the column index k runs from 0 to N2−1. The example in FIG. 6A has N1=4 (four rows) and N2=16 (sixteen columns), a total of 64 frequency bins.

Since data is loaded down the columns, the first frequency bin is loaded to column 0 of row 0, the second point X(1) to column 0, row 1, the third point X(2) to column 0, row 3, and the fourth point X(3) to column 0, row 3. Since the first column is now filled, the fifth input point X(4) is loaded to the top row 0 of column 1. Data is loaded into each column, until the last frequency bins X(N−2) and X(N−1) (62, 63 for the 4×16 example) are loaded into the last rows of the last column.

The input data X(N) is divided into subsets for sign inversion. All of the inputs in a subset are sign inverted when the subset is chosen for inversion, and a bit in the subset is set to indicate to the receiver that the subset was inverted. This inversion bit is located at a prespecified location.

To preserve the complex conjugate symmetry during subset sign inversion, the subsets are chosen as follows. The first row (0) is subset 0, while the third row (2) is subset 2. Rows 1 and 3 are subset 1. Thus the four rows are divided into 3 subsets, with one subset having two rows. In general, there are ½ *N1+1 subsets. The first and last subset has just one row, while all the other subsets have two rows. In general, subset Q has rows Q and N1−Q if Q≠0 or N1/2; otherwise it has only row Q.

The input array X(i,k) is input to first transformer 22. First transformer 22 consists of N1 N2-point IFFT transformers. For the N1=4 example, there are four IFFT, each having 16 inputs and 16 outputs. The upper IFFT receives the 16 inputs from the top row 0 of X(i,k), where i=0. Sixteen outputs are generated, Y(0,k) where i=0 and k=0 to 15. The bottom IFFT receives the 16 inputs for row 3, and also outputs 16 outputs Y(3,i).

Input-Subset Inversion Transferred to intermediate result by IFFT Alignment

Each N2-point IFFT in first transformer 22 receives one row of inputs. Since input subsets contain one or two rows, first-stage transformer 22 is aligned with the input subsets. Sign inversion of one subset affect only one or two of the N2-point IFFTs. The other rows and other N2-point IFFTs are not affected. For example, when subset 0 is inverted, only the outputs of the upper IFFT (i=0) are changed; the outputs of the other 3 first-stage IFFTs are not affected. Thus subset sign inversion is isolated to one or two of the first-stage IFFTs.

Since all the inputs in a subset are inverted, all of the outputs of the IFFT for that subset are also inverted, since the transform multiplies the inputs by an exponential factor before summing, and multiplication of all terms by −1 only inverts the sum. Thus all of the corresponding intermediate outputs Y(i,k) from one or two first-stage IFFT are sign-inverted when the inputs, which are all in the inverted subset are all sign-inverted.

Since only the sign of the intermediate Y(i,k) changes when the input subset sign is changed, the first transform does not have to be recalculated when sign inversion occurs. This greatly reduces computational work for PAR-reduction iterations. The sign-inversion of the input X(i,k) subset is effectively transported to the intermediate results Y(i,k).

The intermediate results Y(i,k) are further transformed by second transformer 24. Second transformer 24 contains N2 IFFTs, each being a N1-point IFFT with N1 inputs and N1 outputs. Only a few of the 16 IFFTs of second transformer 24 are shown in the Figures.

Each N1-point IFFT receives N1 inputs, or one column of the intermediate result array Y(i,k), where k (the column index) is constant for all inputs and outputs in any particular N1-point FFT in second transformer 24. Each N1-point IFEF produces one column of the time-domain output x(i,k).

Figure 6B:
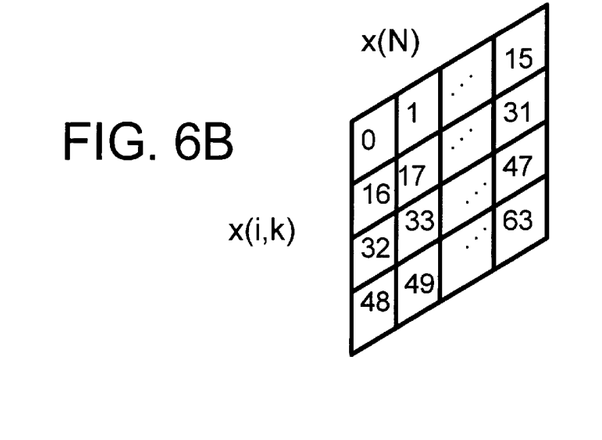
FIG. 6B highlights the time-domain output array.

FIG. 6B highlights the time-domain output array. The time-domain output array is generated by second transformer 24 of FIG. 6A. Each column is generated by a N1-point IFFT that has N1 outputs. The output array is transformed in orientation relative to the input array X(i,k), as the time data points are arranged row-wise rather than column-wise.

Sign-inversion Example—FIGS. 7A–D

Figure 7A:
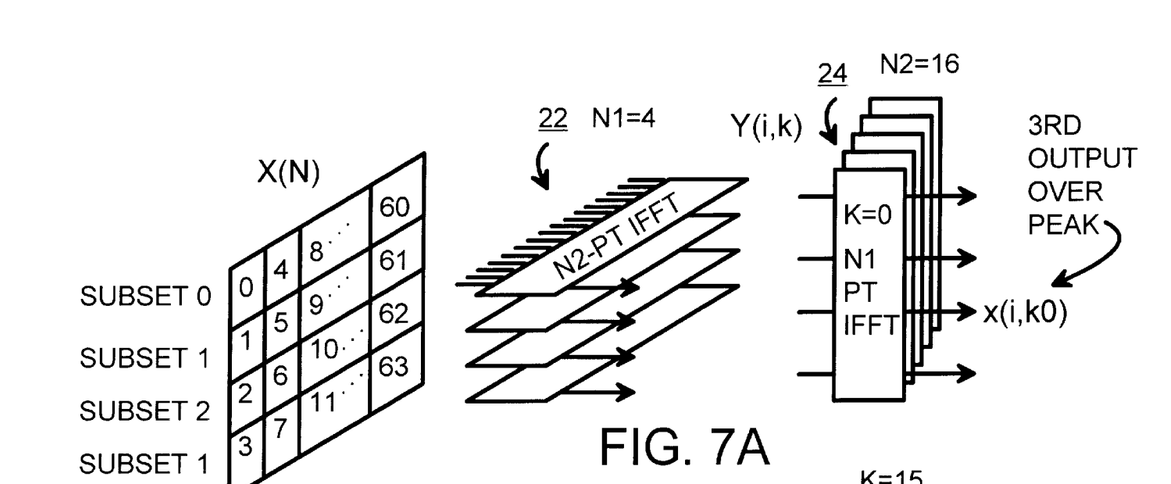
FIGS. 7A–D highlight intermediate-result subset-sign inversion using a two-stage IFFT transformer aligned to the input subsets.

FIGS. 7A–D highlight intermediate-result subset-sign inversion using a two-stage IFFT transformer aligned to the input subsets. In FIG. 7A, the frequency-domain input array X(N) is converted to intermediate results Y(i,k) by first IFFT transformer 22. These intermediate results Y(i,k) are then converted to the time-domain output x(i,k) or x(n) by second transformer 24.

The 64×(N) outputs are examined to determine if any are over the clipping threshold. A peak over threshold is found at location N0, which is at i0=2, k0=0, and designated x(i0,k0). This is the third output of the first column N1-point IFFT.

Of the 64 inputs to second transformer 24, only four are input to the k=0 IFFT that generated the peak over threshold. Thus only four of the 64 intermediate terms have contributed to the over-threshold peak. One or more of these 4 intermediate results can be sign inverted to attempt to reduce the peak. Sign inverting other intermediate results has no effect on the peak x(i0,k0) since they are input to different IFFT blocks (columns).

Figure 7B:
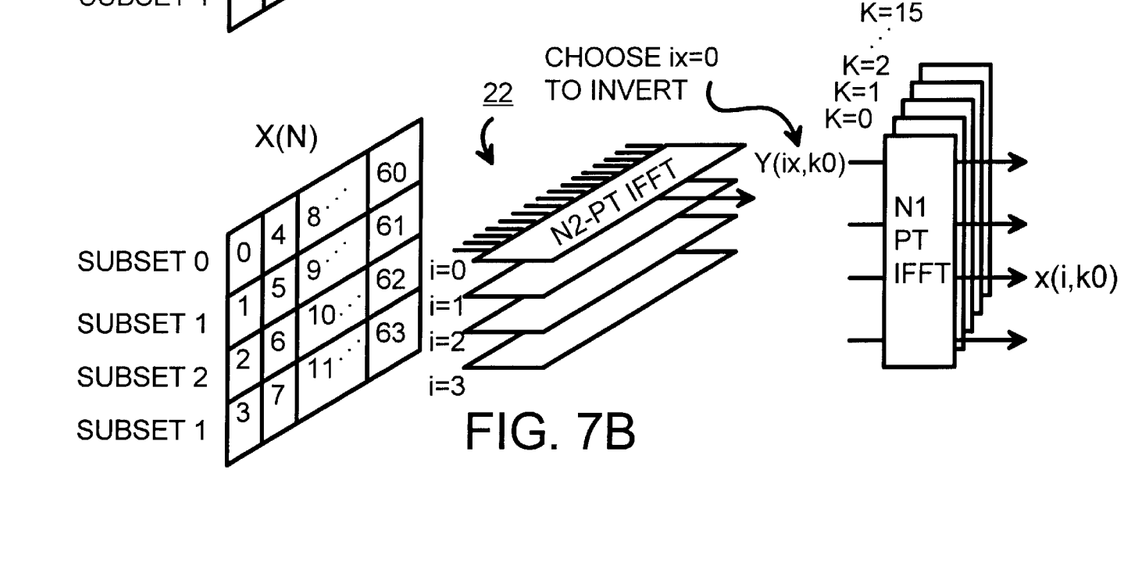

The four intermediate results that contribute to the over-threshold peak at x(i0,k0) are Y(0,0), Y(1,0), Y(2,0), Y(3,0). All have column index k=0, with the row index i varying from 0 to 3. FIG. 7B shows that one or more of these four (N1) intermediate results are chosen for sign inversion to reduce the over-threshold peak. If subset 0 is sign inverted, among 4 intermediate results involved, only Y(0,0) will change its sign. In FIG. 7B, Y(0,0) has the same sign as the output x(2,0), and is sufficiently large in magnitude. The amount −2Y(0,0) is added to the previous result x(2,0) and it is found that the new peak x'(2,0)=x(2,0)−2Y(0,0) is below the clipping threshold. Thus row i=0, which is subset 0, is chosen for sign inversion.

When N1 is bigger, there are many subset sign inversion patterns that can be used to reduce the peak. In general, inverting subset Q(Q >0), which includes rows Q and N1−Q, will add a correction term $-2Y(Q,k0)e^{j2\pi Qi0/N1}-2Y(N1-Q,k0)e^{j2\pi(N1-Q)i0/N1}=-4REAL\{Y(Q,k0)e^{j2\pi Qi0/N1}\}$ to the output x(i0,k0). A good subset set inversion pattern can be chosen such that the correction term is appropriate to reduce the peak at x(i0,k0).

Some subset inversion patterns are not useful in peak reduction. Inverting all the subsets will only change the sign of each sample, thus can not reduce peak. Inverting all the odd subsets will circular shift all the samples, thus can not reduce the peak. Therefore, only useful subset inversions are tested.

Figure 7C:
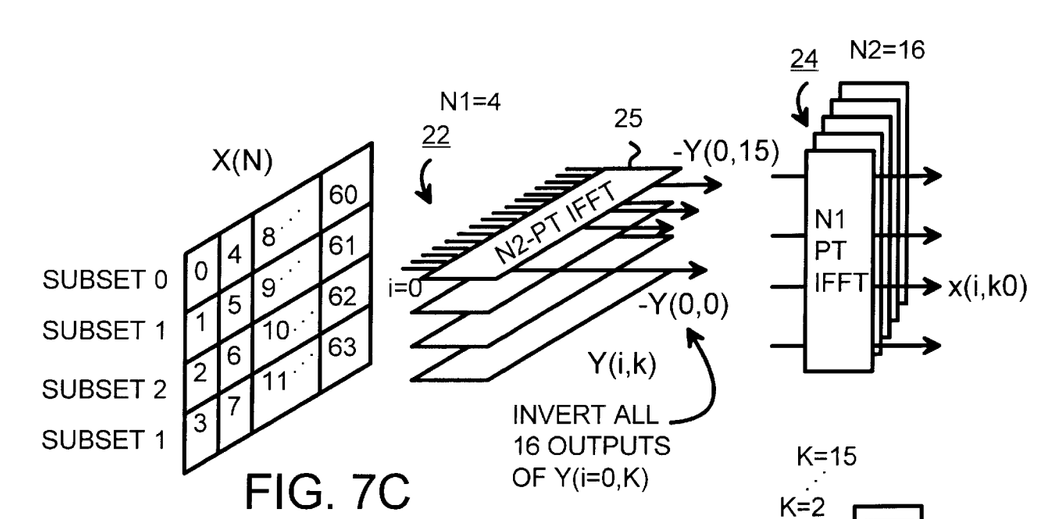

FIG. 7C shows that once subset 0 is chosen for sign inversion, then all the intermediate results for subset 0 are inverted. Since subset 0 is the first row (i=0) of input array X(i,k), only the outputs of the upper N2-point IFFT 25 in first transformer 22 are altered. However, each of the N2 (16) outputs of this IFFT 25 are altered. Since all the N2 inputs are sign inverted, all of the N2 outputs of the upper i=0 IFFT 25 are sign inverted. Thus intermediate results Y(i=0,k) for k=0 to 15 are sign inverted.

Figure 7D:
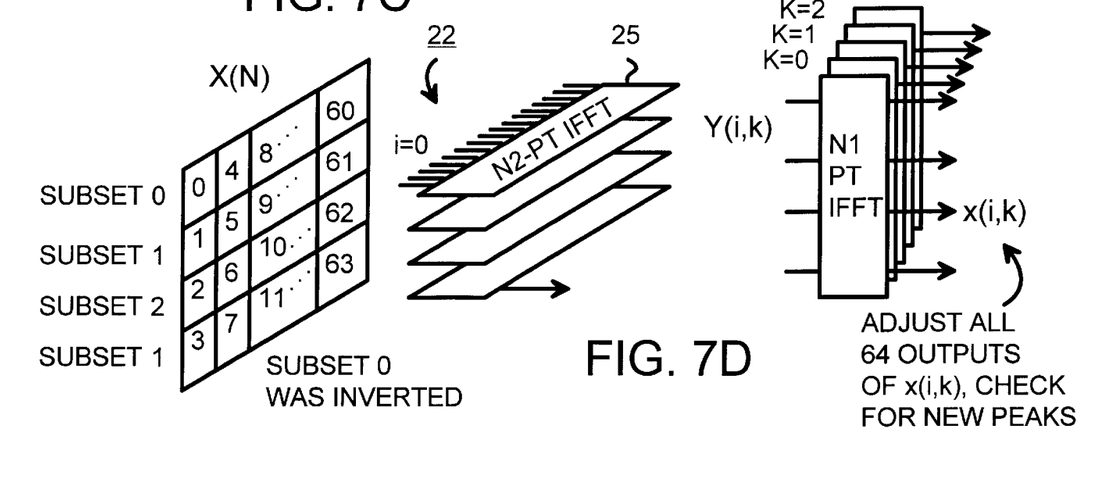

FIG. 7D shows that all the N outputs of second transformer are adjusted for the sign inversion. Since the N2 (16) outputs of upper N2-point IFFT 25 are input to each of the N2 (16) IFFTs in second transformer 24, each of the N1-point IFFTs are altered, and all of their outputs can change. Thus all N (64) outputs of second transformer 24 must be adjusted.

Rather than recalculate all N2 (16) entire IFFTs in second transformer 24, the 64 output s can be adjusted by adding −2Y(0,k). This requires N (64) additions. The new outputs x'(i,k) are compared to the clipping threshold to make sure that no new peaks over the clipping threshold were created at other locations.

Figure 8:
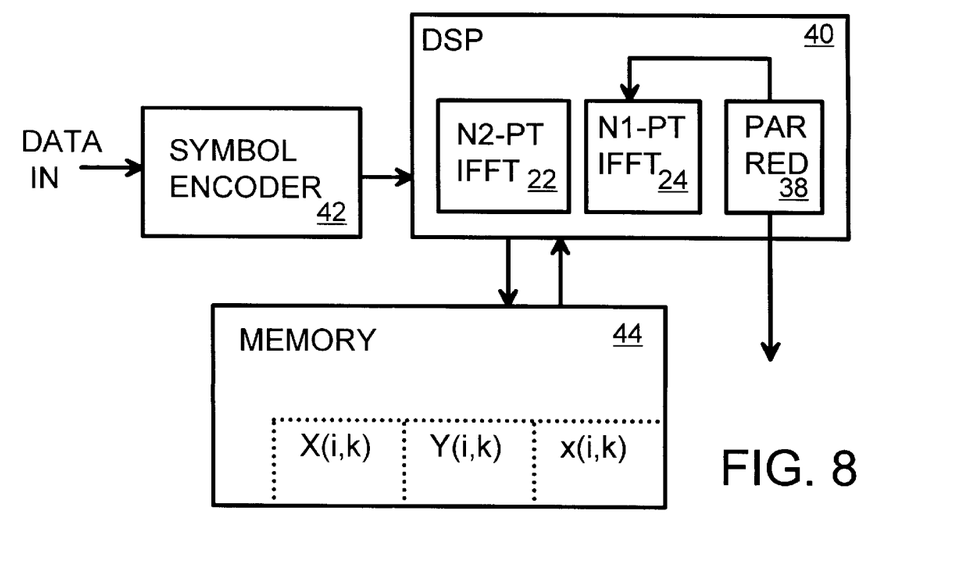
FIG. 8 is a simplified block diagram of the digital portion a DSL transmitter.

IFFTs Executed in DSP—FIG. 8

FIG. 8 is a simplified block diagram of the digital portion a DSL transmitter. The data from the local PC or other customer equipment is sent to symbol encoder 42 for conversion into symbols and assignment to the various frequency bins (multiple tones). A frequency domain input is generated and sent to digital-signal processor (DSP) 40 as input array X(N). This linear array is re-arranged as a rectangular matrix X(i,k) and stored in memory 44. DSP 40 executes firmware routines or programs that execute the IFFT transforms. First the N2-point IFFTs of first transformer 22 are executed on input array X(i,k) from memory 44 to generate intermediate result array Y(i,k). These intermediate results are stored in memory 44 so that they are available to adjust the time domain output for subset inversion, by adding −2Y(Q,k) (for Q=0) or $-4REAL\{Y(Q,k)e^{j2\pi Qi/N1}\}$ (for Q>0) terms to the x(i,k) outputs.

The intermediate result array Y(i,k) is input to second transform 24, which is a program that executes N2 instances of an N1-point (N1-wide) IFFT. The time-domain output is stored in memory 44 as array x(i,k). Some of the output peaks of x(i,k) could be above the clipping threshold. DSP 40 performs a search routine to find signal peaks of x(i,k) and compares these peaks to the clipping threshold, digital value with the maximum absolute value that can be accurately converted to analog voltages. When a peak is found that is over the clipping threshold, PAR reducer 38 identifies which intermediate result Y(i,k) values were input to the IFFT that produced the peak, and then selects the subset or subsets whose sign inversion can reduce the peak to below threshold. The intermediate result Y(i,k) values stored in memory 44 are used to adjust all x(i,k) outputs when one or more subsets are sign-inverted. The final x(i,k) array is re-arranged into a x(N) linear array that represent voltages at sequential time-points. These digital values are converted to the actual analog voltages by an ADC before transmission.

Figure 9:
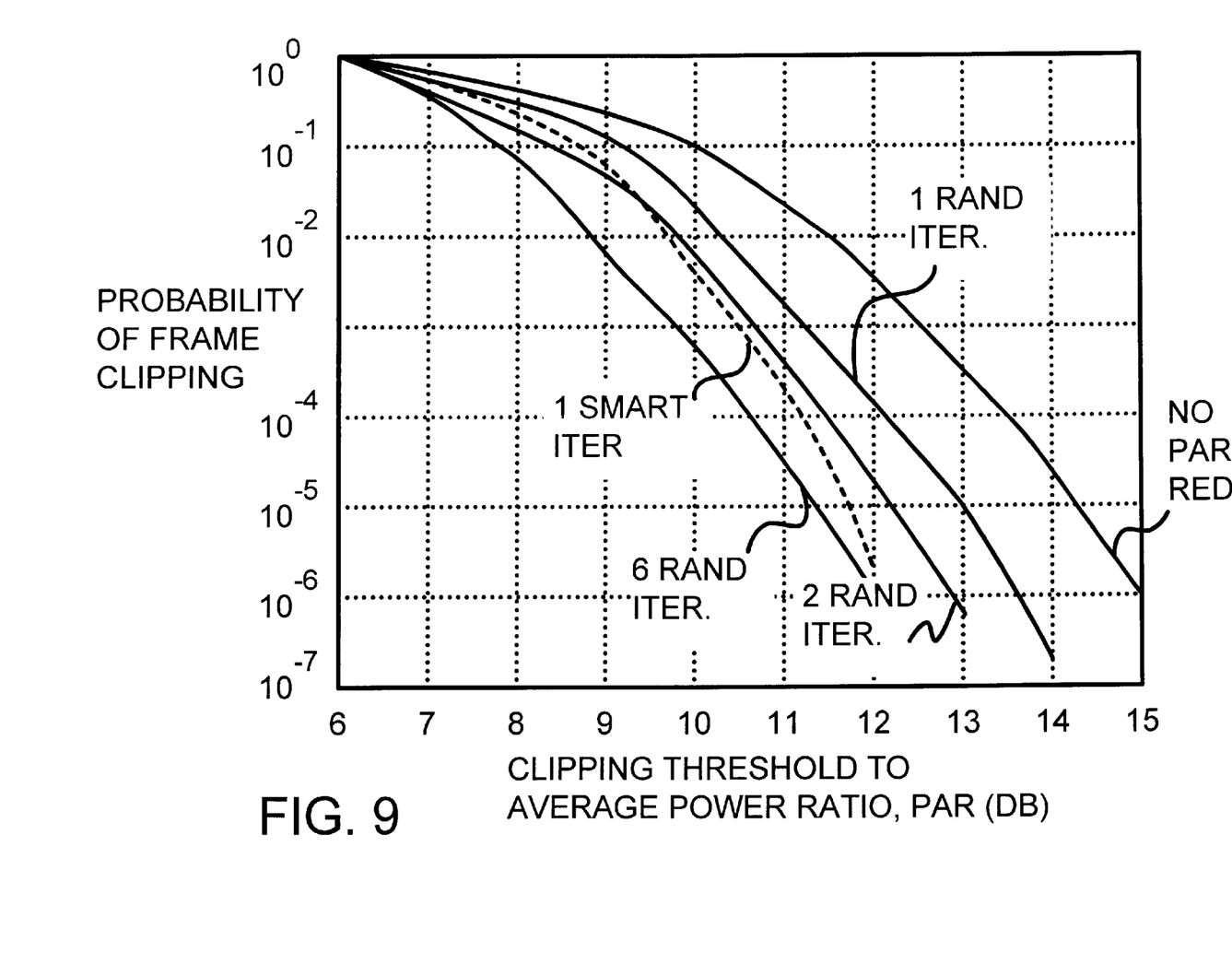
FIG. 9 is a graph showing that clipping probability reduced with just one smart iteration of the invention is equivalent to several random iterations.

Clipping Reduced—FIG. 9

To reduce the peak, we can either randomly or smartly select a subset sign inversion pattern. If we select smartly, the chance of success is much higher. FIG. 9 is a graph showing that clipping probability reduced with just one smart iteration of the invention is equivalent to several random iterations. Several random iterations are replaced by one smart iteration, since the clipping probability of one "smart iteration" using the invention is equivalent to several random iterations. The invention finds the peak over threshold, then searches among the intermediate-result inputs to the IFFT to find which way of sign inversion can effectively reduce the peak. The sign inversion of intermediate-result inputs that cannot effectively reduce the peak are passed on in favor of the inversion of those intermediate results that can sufficiently reduce the peak. In contrast, the other method randomly chooses subsets for sign inversion without regard to whether they can reduce the over-threshold peak.

As FIG. 9 shows, when the desired probability of frame clipping is $1\times10^{-6}$, without PAR reduction, PAR is about 15 dB. Using one PAR-reduction iteration, where the subset is chosen at random, PAR is 13.6 dB, a reduction of 1.4 dB. With two random iterations, PAR is 13 dB, a 2 dB reduction. With six random iterations PAR is 12.2 dB, a reduction of 2.8 dB. In contrast, with one smart iteration that chooses the subset inversion based on its ability to reduce the over-threshold peak, PAR is only 12 dB, a reduction of 3 dB.

From FIG. 9, it can be seen that the effectiveness of the smart iteration increases as the clipping probability reduces since at lower clipping probability, the likelihood of generating new over-threshold peak after the output adjustment is lower. Thus the performance of one smart iteration approaches that of randomly trying all possible iterations.

FIG. 9 shows clipping probability for N=64, N1=8. Similar results are obtained for larger transforms N=256 and N=512 with both N1=8 and N1=16. For N1=4, only one subset can be inverted, and the peak can be reduced by only about 1.5 dB. N1=8 allows for up to 3 subsets to be sign inverted, with a total of 8 combinations (7 iterations), and the peak can be reduced by 3–4 dB. In the limit, one smart iteration approaches the effectiveness of 7 random iterations, the maximum number of possible combinations of the 3 subsets. When no additional peaks are created, one smart iteration is equivalent to picking the best combination on the first attempt. With N1=16, more PAR reduction (4–5dB) can be achieved.

Figure 10:
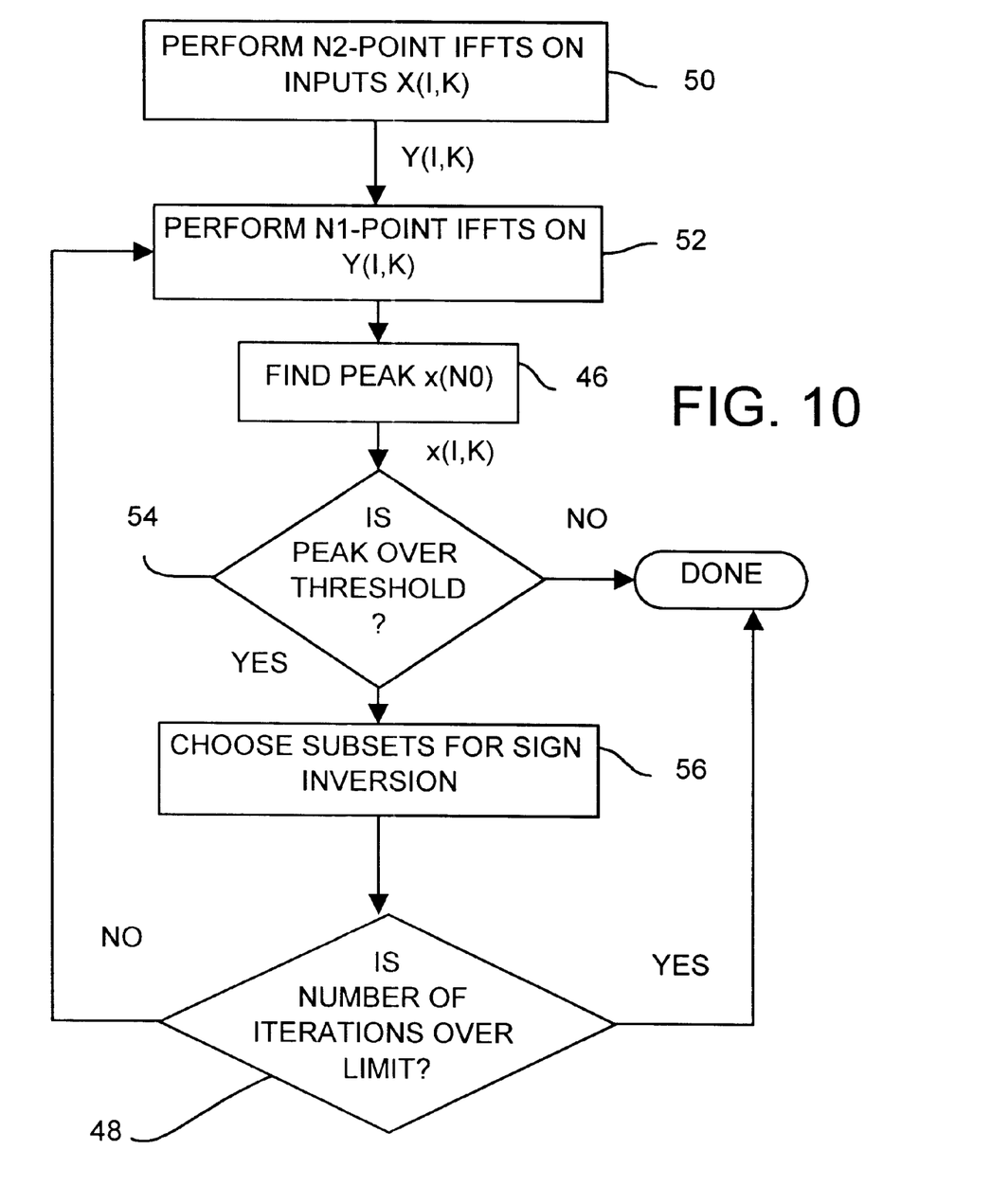
FIG. 10 is an alternative embodiment that is efficient when N1 is small.

Alterative for Small N1—FIG. 10

FIG. 10 is an alternative embodiment that is efficient when N1 is small. FIG. 10 is similar to the flowchart in FIG. 5, except that the entire second transform is repeated for each iteration rather than simply adjust each output.

When a peak over threshold is detected by step 54, the subset is chosen in step 56 as described earlier in reference to FIG. 5. When the number of iterations is within the limit, the second transform is re-calculated in step 52. When N1 is small(N1=4), the complexity of recalculate the N1-point IFFT is similar to that of adjusting all the outputs since the IFFT complexity is proportional to N1. FIG. 10 is an alternative method for small N1, such as N1=4. For N1>4, adjusting output is typically simpler.

Complex Conjugate pairing into Subsets

The input data X(N) is divided into subsets for sign inversion. All of the inputs in a subset are sign inverted when the subset is chosen for inversion, and a bit in the subset is set to indicate to the receiver that the subset was inverted. The subsets are not simply grouped at random but exhibit a symmetry of complex conjugates.

For N1=4, the first row (0) is subset 0, while the third row (2) is subset 2. Rows 1 and 3 are subset 1. Thus the four rows are divided into 3 subsets, with one subset having two rows. In general, there are ½ *N1+1 subsets. The first and last subset has just one row, while all the other subsets have two rows. Namely, subset Q has rows Q and N1, for Q=1 to N1/2−1.

Rows are paired together so that each subset contains the complex conjugates of its members. For the N=64 example, X(63) in row 3 is the complex conjugate of X(1) in row 1, X(62) in row 2 is the complex conjugate of X(2) also in row 2, X(60) in row 0 is the complex conjugate of X(4) in row 0, etc. Thus each subset contains complex conjugate pairs.

In a preferred embodiment, the last 2 subsets are never inverted. Inverting all subsets simply inverts all the outputs including the peak, resulting in no PAR change. Inverting all the odd subsets only shifts the phase of he output in a circular shift and is also ineffective. Thus some subsets are never inverted. The example of N1=4 was shown for simplicity, but has limited appeal for the invention since only one subset can be chosen for inversion. More useful values of N1=8 or N1=16 have 5 or 9 subsets, giving a choice among 3 or 7 subsets for sign inversion.

ADVANTAGES OF THE INVENTION

A peak-to-average reduction technique for multi-tone DSL digitally alters the transmitted output to remove signal peaks that exceed a predetermined peak threshold.

By reducing the PAR of the transmitted signal, dynamic range of the digital-to-analog converter and the line driver is reduced so that less expensive digital-analog converter and line driver can be used to reduce the cost and power consumption in the analog circuitry. On the other hand, the PAR reduction requires additional complexity in the digital signal processor.

The PAR-reduction technique in this invention uses the inherent properties of the IFFT and appropriate subset partitioning to avoid repeating the entire IFFT thus reduce calculational overhead. Furthermore, subsets for sign inversion are selected in a smart manner, reducing the number of iterations required. Finally, an efficient algorithm is invented to adjust the output samples by the differences due to subset sign inversion. As a result, the additional complexity in the digital signal processor for PAR reduction is small. Overall, the cost and power saving in the analog circuitry more than compensates the cost and power increase in the digital signal processor.

ALTERNATE EMBODIMENTS

Several other embodiments are contemplated by the inventor. The examples have shown a N=64 transform with N1=4 and N2=16. Many other sizes are possible, and typically larger transforms are used. Larger N1, such as 16, is often preferred for bigger PAR reduction. The subset partitioning may be altered, and the subsets chosen for sign inversion may be different. The method can also be applied to multi-carrier systems other than the digital subscriber line transceivers.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A peak-reducing Inverse Fourier transformer comprising:

an input array in a frequency domain, the input array containing multiple frequency bins;

an output array in a time domain, the output array containing data points representing voltages at different time points;

an intermediate array containing intermediate values;

a first transformer, receiving the input array, for generating the intermediate array by partially Inverse Fourier transforming the input array;

a second transformer, receiving the intermediate array, for generating the output array by partially inverse Fourier transforming the intermediate array;

a peak searcher, coupled to the output array, for searching the data points in the output array for voltages falling outside a clipping threshold, the peak searcher for identifying a peak location of an over-threshold peak in the output array; and a subset sign inverter, coupled to the peak searcher, for inverting signs of subsets of original intermediate values in the intermediate array to generate sign-inverted intermediate values, wherein when the sign-inverted intermediate values replace the original intermediate values in the intermediate array, the over-threshold peak in the output array is reduced in voltage and is within the clipping threshold, whereby the over-threshold peak is reduced by sign-inversion of the subsets of the original intermediate values.

2. The peak-reducing Inverse Fourier transformer of claim 1 wherein a chosen subset is one of a plurality of subsets of the intermediate array;

wherein each subset contains all intermediate values in one or two rows of the intermediate array, wherein the subsets are row-aligned.

3. The peak-reducing Inverse Fourier transformer of claim 2 wherein the input array is also divided into a plurality of input subsets, each input subset containing all frequency bins in one or two rows of the input array;

wherein each input subset corresponds to a subset of the intermediate array by including a same row location in an array, whereby the input subsets are aligned with the subsets in the intermediate array.

4. The peak-reducing Inverse Fourier transformer of claim 3 wherein each input subset contains complex conjugate pairs of frequency bins.

5. The peak-reducing Inverse Fourier transformer of claim 3 further comprising:

re-calculating means, activated when the peak searcher finds the over-threshold peak, for sign-inverting and calculating adjustment terms based on all intermediate values to generate adjustment terms, the recalculating means adding the adjustment terms to the data points in the output array to generate an adjusted output array, whereby the output array is adjusted by adding the adjustment terms rather thin re-executing an Inverse Fourier transform.

6. The peak-reducing Inverse Fourier transformer of claim 5 wherein the adjusted output array is an inverse Fourier transform of a subset-inverted input array; and wherein the subset-inverted input array is the input array modified by sign-inverting all frequency bins in an input subset that corresponds to the chosen subset of the intermediate array, whereby input-subset sign-inversion peak reduction is performed by sign-inversion of the intermediate array subset.

7. The peak-reducing Inverse Fourier transformer of claim 3 wherein:

the input array comprises a total of N frequency bins arranged into N1 rows of N2 frequency bins;

the first transformer comprises a plurality of N1 first IFFT modules, the first IFFT modules being inverse fast-Fourier transform (IFFT) modules, each of the first IFFT modules having N2 inputs comprising one row of the input array, each of the first IFFT modules generating N2 intermediate values in a row of the intermediate array, the N2 intermediate values being an Inverse Fourier transform combination of the N2 inputs to a first IFFT module; and the second transformer comprises a plurality of N2 second IFFT modules, the second IFFT modules being inverse fast-Fourier transform (IFFT) modules, each of the second IFFT modules having N1 inputs comprising one column of the intermediate array, each of the second IFFT modules generating N1 data points in a column of the output array, the N1 data points being a Fourier-transform combination of the N1 inputs to a second IFFT module;

whereby the first transformer is a row-aligned IFFT while the second transformer is a column-aligned IFFT, and whereby the input subsets and subsets of the intermediate array are both row-aligned.

8. The peak-reducing Inverse Fourier transformer of claim 7 wherein the multiple frequency bins are arranged column-wise into the input array, but the data points are transmitted row-wise in time from the data points in the output array, whereby the row and columns are reversed during transforms.

9. A Digital-Subscriber Line (DSL) transmitter comprising:

a symbol encoder, receiving data from a local data source, for outputting symbols representing the data into an input array;

first transform means, receiving the input array, for generating an intermediate array by partially Inverse Fourier transforming the input array;

second transform means, receiving the intermediate array, for generating an output array by partially inverse Fourier transforming the intermediate array, the output array in a time domain, containing data points representing voltages at different time points;

a memory, coupled to be written by the first transform means and the second transform means, for storing the intermediate array and the output array;

a digital-to-analog converter, receiving the data points from the output array, for converting the data points to analog voltages, the digital-to-analog converter having a clipping threshold wherein data points having digital values over the clipping threshold are not accurately converted to analog voltages;

a peak searcher, coupled to the output array, for searching the data points in the output array for voltages falling outside the clipping threshold, the peak searcher for identifying a peak location of an over-threshold peak in the output array; and a subset sign inverter, coupled to the peak searcher, for inverting signs of subsets of intermediate values in the intermediate array to generate a sign-inverted intermediate values, wherein when the sign-inverted intermediate values replace the subsets of intermediate values in the intermediate array, the over-threshold peak in the output array is reduced in voltage and is within the clipping threshold, whereby the over-threshold peak is reduced by sign-inversion of the intermediate values, and whereby the intermediate values are stored in the memory.

10. The DSL transmitter of claim 9 wherein:

the input array comprises a total of N frequency bins arranged into N1 rows of N2 frequency bins;

the first transform means comprises a plurality of N1 first IFFT modules, the first IFFT modules being inverse fast-Fourier transform (IFFT) modules, each of the first IFFT modules having N2 inputs comprising one row of the input array, each of the first IFFT modules generating N2 intermediate values in a row of the intermediate array, the N2 intermediate values being a Fourier-transform combination of the N2 inputs to a first IFFT module; and the second transform means comprises a plurality of N2 second IFFT modules, the second IFFT modules being inverse fast-Fourier transform (IFFT) modules, each of the second IFFT modules having N1 inputs comprising one column of the intermediate array, each of the second IFFT modules generating N1 data points in a column of the output array, the N1 data points being a Fourier-transform combination of the N1 inputs to a second IFFT module;

whereby the first transform means is a row-aligned IFFT while the second transform means is a column-aligned IFFT, and whereby input subsets and subsets of the intermediate array are both row-aligned.

11. The DSL transmitter of claim 10 wherein the peak searcher identifies a target second IFFT module that outputted the over-threshold peak;

wherein the sign inverter examines the N1 inputs to the target second IFFT module but does not examine other inputs to other second IFFT modules;

wherein intermediate values are inputs to the target second IFFT module.

12. The DSL transmitter of claim 11 wherein N1 is 4, 8, or 16 and wherein N is 64, 256, or 512.

13. A method for reducing signal peaks transmitted over a digital telephone line, the method comprising:

receiving a frequency-domain input array containing N input frequencies;

arranging the input array as a matrix of N2 columns and N1 rows;

executing a N2-point inverse fast-Fourier transform (IFFT) on N2 inputs from a row in the input array, and outputting N2 intermediate results to a row in an intermediate array;

executing other N2-point IFFT transforms on other rows of N2 inputs from the input array and outputting N2 intermediate results from each IFFT to other rows in the intermediate array until all N1 rows in the input array have been transformed;

storing the intermediate array with the intermediate results;

executing a N1-point IFFT transform on N1 intermediate results from a column in the intermediate array, and outputting N1 time-domain outputs to a column in an output array;

executing other N1-point IFFT transforms on other columns of N1 inputs from the intermediate array and outputting N1 time-domain outputs from each IFFT to other columns in the output array until all N2 columns in the intermediate array have been transformed;

scanning the output array for time-domain outputs that represent voltages exceeding a clipping threshold of a digital-to-analog converter in a transmitter;

generating a locator for a time-domain output exceeding the clipping threshold;

determining which of the N1-point IFFT transforms is a target IFFT that generated the time-domain output identified by the locator;

examining an intermediate result that was input to the target IFFT to determine if inverting a sign of that intermediate result can sufficiently reduce a magnitude of the time-domain output exceeding the clipping threshold;

examining other intermediate results that were input to the target IFFT to determine if inverting a sign of those intermediate results can sufficiently reduce the magnitude of the time-domain output exceeding the clipping threshold;

choosing one of the intermediate results that were input to the target IFFT as a selected intermediate result;

inverting signs of all intermediate results in a selected row of the intermediate array that contains the selected intermediate result; and re-generating all time-domain outputs in the output array to reflect sign inversion of the selected row of the intermediate array, whereby the time-domain output over threshold is reduced by examining inputs to the target IFFT producing the time-domain output over the clipping threshold and sign-inverting an intermediate-array input.

14. The method of claim 13 wherein re-generating all time-domain outputs comprises:

re-executing all N2 of the N1-point IFFT transforms using the intermediate array with the selected row sign inverted as inputs, whereby the N1-point IFFT transforms are re-executed but the N2-point IFFT. Transforms are not re-executed when a row is sign inverted to reduce a voltage peak.

15. The method of claim 13 wherein re-generating all time-domain outputs comprises:

inverting a sign and computing adjust terms;

adding one of the adjust terms to each of the time-domain outputs in the output array to generate an adjusted output array;

further comprising:

transmitting the adjusted output array over the digital telephone line;

whereby neither the N1-point IFFT transforms nor the N2-point IFFT transforms are re-executed when a row is sign inverted to reduce a voltage peak.

16. The method of claim 15 wherein an adjust term in a column is added to all time-domain outputs for that column.

17. The method of claim 13 wherein choosing one of the intermediate results that were input to the target IFFT as a selected intermediate result comprises randomly choosing one of the intermediate results input to the target IFFT.

18. The method of claim 13 wherein choosing one of the intermediate results that were input to the target IFFT as a selected intermediate result comprises choosing, in a predetermined order, one of the intermediate results input to the target IFFT.

19. The method of claim 13 wherein choosing one of the intermediate results that were input to the target IFFT as a selected intermediate result comprises choosing, based on an amount of peak reduction, one of the intermediate results input to the target IFFT.

20. The method of claim 13 further comprising:

re-scanning the output array for adjusted time-domain outputs that represent voltages exceeding the clipping threshold of the digital-to-analog converter in the transmitter;

transmitting the output array with the adjusted time-domain outputs over the digital telephone line when no adjusted time-domain output exceeds the clipping threshold;

when an adjusted time-domain output exceeds the clipping threshold:

generating a new locator for the adjusted time-domain output exceeding the clipping threshold;

determining which of the N1-point IFFT transforms is the target IFFT that generated the adjusted time-domain output identified by the new locator;

examining intermediate results that were input to the target IFFT to determine if inverting a sign of those intermediate results can sufficiently reduce the magnitude of the adjusted time-domain output exceeding the clipping threshold;

choosing one of the intermediate results that were input to the target IFFT as the selected intermediate result;

inverting signs of all intermediate results in a selected row of the intermediate array that contains the selected intermediate result; and re-generating all time-domain outputs m the output array to reflect sign inversion of the selected row of the intermediate array, whereby the adjusted time-domain outputs are scanned for new peaks over threshold and peak reduction repeated when a new peak exceeds threshold.

* * * * *